US011689238B2

(12) United States Patent
Sharinn et al.

(10) Patent No.: US 11,689,238 B2
(45) Date of Patent: Jun. 27, 2023

(54) GLASS BREAKER AND SECURITY ALERT APPARATUS AND METHOD OF APPLICATION THEREOF

(71) Applicant: TONKA ASSET MANAGEMENT LLC, Lake Success, NY (US)

(72) Inventors: Marc Sharinn, Lake Success, NY (US); Debrah Sharinn, Lake Success, NY (US)

(73) Assignee: TONKA ASSET MANAGEMENT LLC., Lake Success, NY (US)

( * ) Notice: Subject to any disclaimer, the term of this patent is extended or adjusted under 35 U.S.C. 154(b) by 212 days.

(21) Appl. No.: 16/879,449

(22) Filed: May 20, 2020

(65) Prior Publication Data

US 2020/0373957 A1 Nov. 26, 2020

Related U.S. Application Data

(60) Provisional application No. 62/850,355, filed on May 20, 2019.

(51) Int. Cl.
*H04B 1/3888* (2015.01)
*A62B 3/00* (2006.01)
*H04M 1/725* (2021.01)

(52) U.S. Cl.
CPC .......... *H04B 1/3888* (2013.01); *A62B 3/005* (2013.01); *H04M 1/725* (2013.01)

(58) Field of Classification Search
CPC ........ H04M 1/21; H04M 1/185; H04M 1/725; H04B 1/3888; B25F 1/006; A62B 3/00
See application file for complete search history.

(56) References Cited

U.S. PATENT DOCUMENTS

| 6,811,435 | B1 * | 11/2004 | Fan | H01R 24/58 439/669 |
|---|---|---|---|---|
| 10,786,070 | B1 * | 9/2020 | Young | B26B 11/00 |
| 2014/0259438 | A1 * | 9/2014 | Rubin | B25F 1/006 7/163 |
| 2018/0281694 | A1 * | 10/2018 | Chen | B60R 11/0241 |
| 2019/0193658 | A1 * | 6/2019 | Volkmann | B60Q 9/00 |
| 2020/0001122 | A1 * | 1/2020 | Patlan | A62B 3/005 |

\* cited by examiner

*Primary Examiner* — Jean A Gelin
(74) *Attorney, Agent, or Firm* — Dilworth & Barrese, LLP; Michael J. Musella, Esq.

(57) ABSTRACT

An apparatus that is integrated into a mobile phone case that can assist in breaking a glass window of a locked vehicle to aid an occupant exit the vehicle in an emergency situation and send an alert to the appropriate authorities to inform them of the emergency situation.

16 Claims, 2 Drawing Sheets

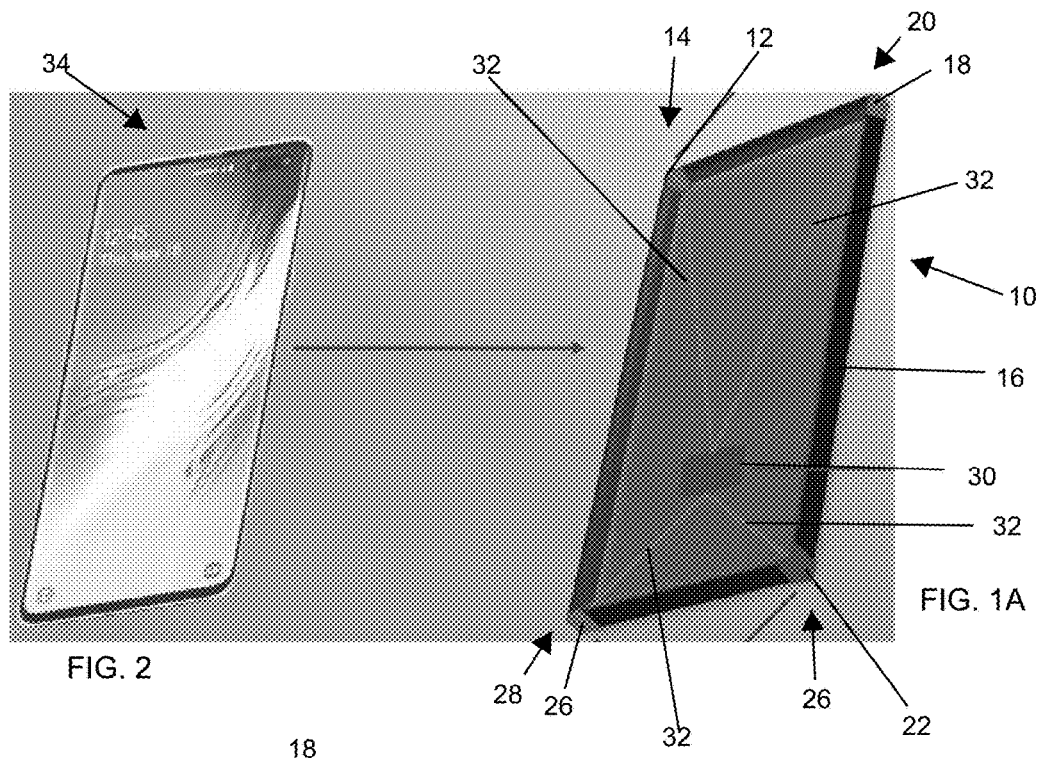
FIG. 2
FIG. 1A
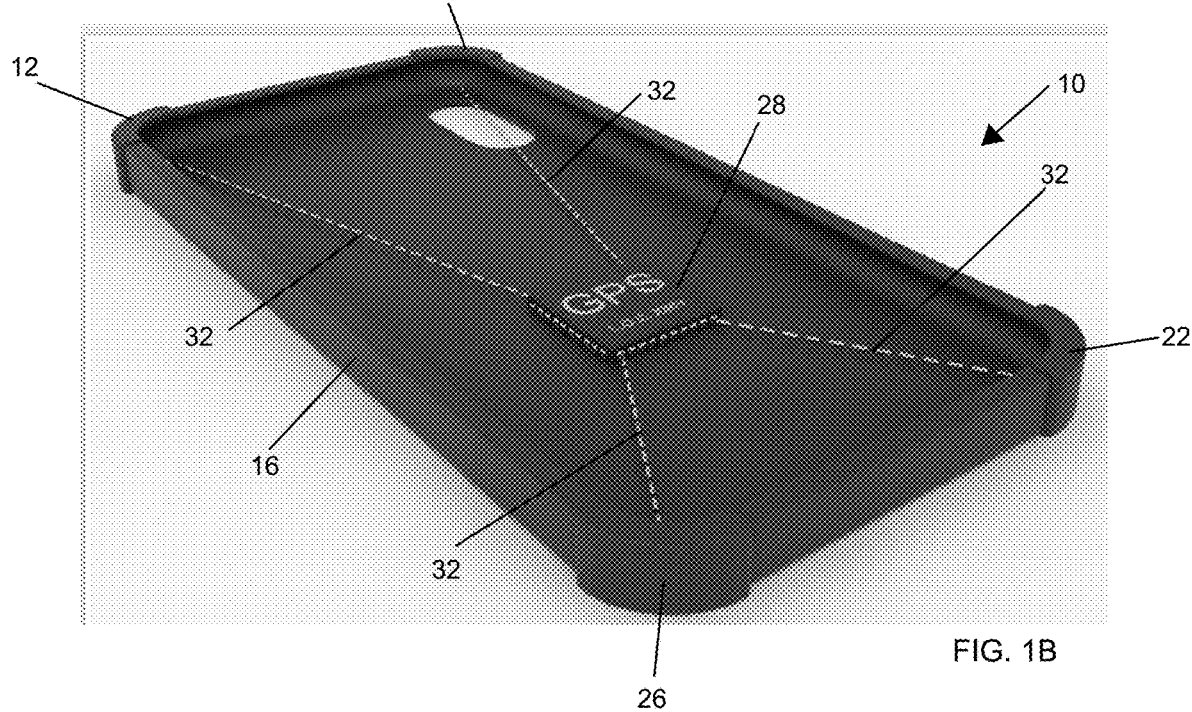
FIG. 1B

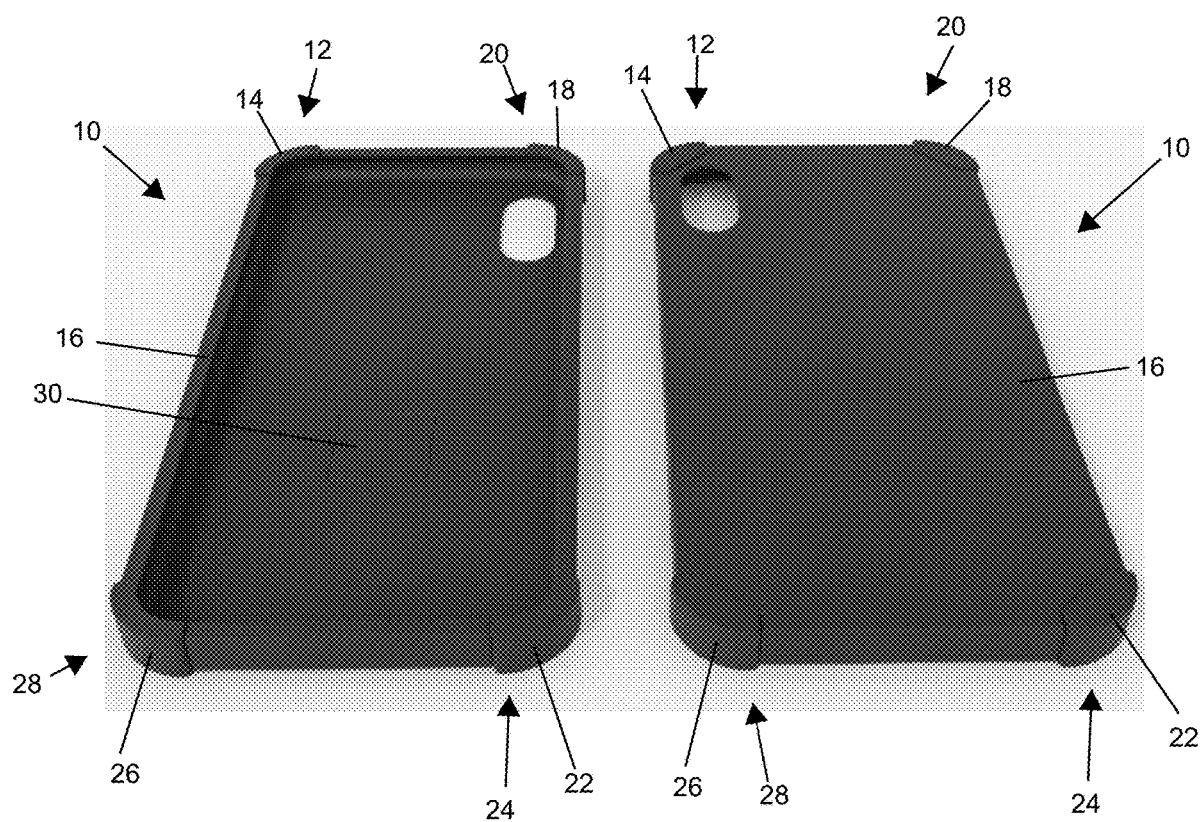

GLASS BREAKER AND SECURITY ALERT APPARATUS AND METHOD OF APPLICATION THEREOF

CROSS-REFERENCE TO RELATED APPLICATION

This application claims priority to U.S. Provisional Patent Application No. 62/850,355, filed on May 20, 2019, which is hereby incorporated by reference in its entirety as part of the present disclosure.

FIELD OF INVENTION

This invention relates generally to the field of safety and security of individuals, animals and the like and more specifically to an apparatus that is integrated in a mobile phone case that can assist in breaking a glass window of a locked vehicle to allow an occupant of the locked vehicle to exit the vehicle and simultaneously alert the appropriate authorities of the emergency situation.

BACKGROUND OF THE INVENTION

Escaping from a vehicle in an emergency can be very challenging depending on the situation. For example, such situations may occur if a vehicle door cannot be opened because of an accident or malfunction, an individual or a pet becomes trapped within the vehicle, an individual is locked in the vehicle and needs to quickly exit the vehicle voluntarily or against their will, etc. In many instances, the individual and/or pet will have a very limited amount of time to safely exit the vehicle and cannot wait for or, in the case of the individual, have time to contact the appropriate authorities to assist in helping them safely exit the vehicle. Breaking a vehicle window to escape can be challenging and in some cases may not be possible, can cause injury to the person attempting to break the window and/or the individual and/or pet in the vehicle. Most individuals typically have a mobile phone in close proximity to their body in a vehicle. However, an individual may not be able to use their mobile phone to place an emergency call while in distress or if the incident occurs in an area with limited or no mobile phone service.

Various devices exist that can be utilized to break a glass window of a vehicle. Such devices include hammers that have a pointed tip and spring-loaded window punches that are specifically designed to puncture a window in an emergency situation. However, these devices, even if owned by an individual that needs to break a window of a vehicle, are commonly not readily accessible in the time of need, cumbersome to carry and do not combine both a tool to safely break a window of a vehicle and alert system that is configured to notify applicable authorities of the emergency situation so they can quickly provide assistance.

SUMMARY OF THE INVENTION

The present invention is broadly directed to a glass breaker and security alert system that is integrated into a mobile phone case that is configured to be used to break a window(s) of a vehicle in an emergency situation. The glass breaker can be integrated into the case in a variety of ways. For example, in an embodiment, the glass breaker can be integrated into one or more corners of a case. In an embodiment, the glass breaker can include a spring-loaded spike(s) that can be comprised of stainless steel, ceramic or the like and can be depressible to activate the device.

In conjunction with the activation of the device to break a glass window(s), a security alert can be sent via the device to a local central monitoring station. The security alert can, for example, be via GPS notification of a microchip that is integrated into the case and activated when the glass breaker is initiated by a user. Once the glass breaker is activated, the security alert notification can be sent to the central monitoring station that can provide the location of the incident to the appropriate authorities to respond to the situation by providing GPS coordinates of the location where the glass breaker was activated and then real time location of the device. The notification can be audible or silent and can contain an illumination display (e.g., flashing lights).

BRIEF DESCRIPTION OF TRE DRAWING

FIGS. 1A and 1B are each a perspective view of a mobile phone case in which a glass breaker and security apparatus is integrated according to an exemplary embodiment of the present invention;

FIG. 2 is a perspective view of a mobile phone that can be secured within the mobile phone case of FIG. 1; and FIGS. 3 and 4 are front and back perspective views, respectively, of the mobile phone case of FIG. 1.

DETAILED DESCRIPTION OF EMBODIMENTS OF THE INVENTION

With reference now to the drawings, and in particular to FIG. 1A through FIG. 4, an embodiment of glass breaker and security apparatus of the present invention, will be described.

FIGS. 1A and 1B are perspective views of an embodiment of an apparatus 10 that is configured to both break a window of vehicle and alert the applicable authorities of that the device is in use and assistance is required. The apparatus 10 includes a first glass breaker 12 that is located at a first corner 14 of a mobile phone case 16, a second glass breaker 18 that is located at a second corner 20 of the case 16, a third glass breaker 22 that is located at a third corner 24 of the case 16, a fourth glass breaker 26 that is located at a fourth corner 28 of the case 16 and an alert system 30. While four glass breakers 12, 18, 22 and 26 are shown, the apparatus 10 can include as few as a single glass breaker or more than four glass breakers.

The glass breakers 12, 18, 22 and 26 which can, for example, be made of stainless steel or ceramic, can each be spring-loaded and can include a pointed tip (e.g., spike) that can be configured to extend upon activation to allow a vehicle occupant to break a side window of a vehicle in order to escape the vehicle. In an embodiment, to activate the glass breakers 12, 18, 22 and 26, an impact force must be applied between a glass breaker 12, 18, 22, 26 and an object (i.e., window of a vehicle). Common contact between the case 16 and an object such as the window, ground, etc. will not release the glass breakers 12, 18, 22, 26 and/or activate the alert system 30. Alternatively, in an embodiment, the case 16 can include a button, switch or the like that can be utilized to activate one or more of the breakers 12, 18, 22, 26 for use. In yet another embodiment, the corners of the case 16 can be comprised of a hard material such as stainless steel, ceramic, etc. that does not extend, but can be used to break a window of a vehicle with a concentrated blow to the window.

The alert system 30, which can contain a pressure switch and can include a GPS notification chip/alarm that, can be connected to, embedded in or partially embedded in the case 16 and mechanically, electro-mechanically and/or electronically, connected to one or more of the glass breakers 12, 18, 22, 26. As shown in FIGS. 1A and 1B, the alert system 30 is connected by wires or fiber optics 32.

When at least one of the glass breakers 12, 18, 22 and 26 is activated, the alert system 30 can simultaneously be activated. Alternatively, the alert system 30 and in turn GPS/alarm can be activated by contacting the pressure switch or another button, switch (e.g., on/off switch) or the like on the body of the case 16. In order to activate the alert system 30, a threshold pressure applied to the switch. Upon activation, the alert system 30 can project an audible or silent alarm that is linked to a central monitoring station and provide the central monitoring station with the location of the case 16. The appropriate authorities can then respond to the notification to assist the individual(s) that activated the glass break system 10.

In yet another embodiment, a code may be submitted to the central monitoring station in the event of a false alarm and/or a button may be located in the case that can, for example, be depressed and held to alert the applicable authorities of a false alarm. In a further embodiment, an inputted code or a switch can be located on the case that engages a high alert mode, which be activated when an individual enters a vehicle or a threatening situation, so that any force can activate the GPS/alarm without a code.

It is noted that the case 16 can contain a battery integrated therein to power the alert system 30. Alternatively, the alert system 30 can be powered by solar energy, by the battery of the phone it is affixed thereon (wired or wirelessly) or it can be plugged into a charging device that can be connected to an electrical outlet, as needed.

FIG. 2 depicts a mobile phone 32 that can be arranged and secured within the case 10.

FIGS. 3 and 4 illustrate views of an embodiment of the apparatus 10.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

What is claimed is:

1. A safety apparatus, comprising:
    a mobile phone case configured for a mobile phone to be secured therein;
    at least one glass breaker arranged within the housing that is configured to break a window of a vehicle;
    an alert system associated with the housing and connected to the at least one glass breaker; and
    wherein the alert system contains a pressure switch and include a GPS notification chip and the alert system activates when a threshold pressure on the body of the case, and wherein the alert system is connected by wires or fiber optics in the four glass breakers.

2. The safety apparatus of claim 1, wherein the at least one glass breaker includes four glass breakers that are fixed at each corner of the mobile phone case.

3. The safety apparatus of claim 1, wherein the at least one glass breaker is one of mechanically deployable upon impact with an object, electromagnetically deployable and electronically deployable.

4. The safety apparatus of claim 1, wherein the at least one glass breaker device is spring-loaded.

5. The safety apparatus of claim 1, wherein the at least one glass breaker device contains a pointed tip that is configured to contact a window of a vehicle and break the window.

6. The safety apparatus of claim 1, wherein the alert system is one of electronically, electromechanically and mechanically connected to the at least one glass breaker.

7. The safety apparatus of claim 1, wherein, when the alert system is activated in conjunction with the at least one glass breaker, the signal is sent to the remote location.

8. The safety apparatus of claim 1, wherein the alert system contains a GPS monitoring chip to indicate to the remote location the location of the safety apparatus.

9. A method of deploying and activating a safety apparatus for use to break a window of a vehicle comprising the following steps:
    providing the safety apparatus comprising a mobile phone case configured for a mobile phone to be secured therein, at least one glass breaker arranged within the mobile phone case and an alert system associated with the mobile phone case and connected to the at least one glass breaker;
    gripping the safety apparatus;
    contacting the at least one glass breaker with the window of the vehicle to break the window;
    activating the alert system to send a signal to a remote location to alert appropriate authorities to respond to the emergency situation; and
    wherein the alert system contains a pressure switch and include a GPS notification chip and the alert system activates when a threshold pressure on the body of the case, and wherein the alert system is connected by wires or fiber optics in the four glass breakers.

10. The method of claim 9, wherein the at least one glass breaker includes four glass breakers that are fixed at each corner of the mobile phone case and each glass breaker can be utilized as needed to break the window of a vehicle.

11. The method of claim 9, wherein, upon impact with the window, the at least one glass breaker device is one of mechanically deployable, electromagnetically deployable and electronically deployable.

12. The method of claim 9, wherein the at least one glass breaker is spring-loaded.

13. The method of claim 9, wherein the at least one glass breaker contains a pointed tip that is configured to contact a window of a vehicle and break the window.

14. The method of claim 9, wherein the alert system is one of electronically, electromechanically and mechanically connected to the at least one glass breaker.

15. The method of claim 9, wherein, when the alert system is activated simultaneously in conjunction with the at least one glass breaker, the signal is sent to the remote location.

16. The method of claim 9, wherein, wherein the alert system contains a GPS monitoring microchip to indicate to the remote location of the safety apparatus.

* * * * *